(12) United States Patent
Beljaars et al.

(10) Patent No.: US 12,706,817 B2
(45) **Date of Patent: *Aug. 11, 2026**

(54) PASSING DEVICE CONTEXT INFORMATION AND ASSOCIATED CONNECTED DEVICE IDENTITY TO SERVICE IN CUSTOMER-PREMISES EQUIPMENT

(71) Applicant: Cujo LLC, Covina, CA (US)

(72) Inventors: Ivar Beljaars, Numansdorp (NL); Santeri Kangas, Kirkkonummi (FI)

(73) Assignee: Cujo LLC, Covina, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 18/434,197

(22) Filed: Feb. 6, 2024

(65) Prior Publication Data

US 2024/0314050 A1 Sep. 19, 2024

Related U.S. Application Data

(63) Continuation-in-part of application No. 18/185,741, filed on Mar. 17, 2023, now Pat. No. 12,556,425.

(51) Int. Cl.
*H04L 41/5054* (2022.01)
*H04L 12/28* (2006.01)
(Continued)

(52) U.S. Cl.
CPC ...... *H04L 41/5054* (2013.01); *H04L 12/2898* (2013.01); *H04L 41/085* (2013.01);
(Continued)

(58) Field of Classification Search
CPC ............. H04L 41/5054; H04L 12/2898; H04L 41/085; H04L 61/103; H04L 61/5014;
(Continued)

(56) References Cited

U.S. PATENT DOCUMENTS 11,528,189 B1 12/2022 Egri et al.
2010/0172266 A1 7/2010 Piccinini et al.
(Continued)

FOREIGN PATENT DOCUMENTS

EP 3941100 A1 5/2021
WO 2013105104 A2 9/2012

OTHER PUBLICATIONS

Office Action for U.S. Appl. No. 18/185,741, dated Jun. 18, 2025, 31 pages.
(Continued)

*Primary Examiner* — Brian J. Gillis
*Assistant Examiner* — Chhian (Amy) Ling
(74) *Attorney, Agent, or Firm* — Dority & Manning, P.A.

(57) ABSTRACT

A device identifier of a connected device connected to a customer-premises equipment (CPE) is associated with a device context information of the connected device. The CPE is configured to implement a local area network (LAN) for a data communication of the connected device. The device context information and the associated device identifier are passed to a service in the CPE using a communication mechanism. The CPE is configured to implement a platform for the service. The communication mechanism is configured to operate in the CPE.

20 Claims, 7 Drawing Sheets

(51) Int. Cl.

| | |
|---|---|
| ***H04L 41/085*** | (2022.01) |
| ***H04L 61/103*** | (2022.01) |
| ***H04L 61/5014*** | (2022.01) |
| *H04L 61/5038* | (2022.01) |
| *H04L 61/5092* | (2022.01) |
| *H04L 101/622* | (2022.01) |

(52) U.S. Cl.
CPC ........ *H04L 61/103* (2013.01); *H04L 61/5014* (2022.05); *H04L 12/2801* (2013.01); *H04L 61/5038* (2022.05); *H04L 61/5092* (2022.05); *H04L 2101/622* (2022.05)

(58) Field of Classification Search
CPC ............. H04L 12/2801; H04L 61/5038; H04L 61/5092; H04L 2101/622
See application file for complete search history.

(56) References Cited

U.S. PATENT DOCUMENTS

| | | | | |
|---|---|---|---|---|
| 2013/0044760 | A1* | 2/2013 | Harjanto | H04L 61/103 370/401 |
| 2013/0298221 | A1 | 11/2013 | Smith et al. | |
| 2016/0094883 | A1* | 3/2016 | Tidwell | H04N 21/812 725/109 |
| 2016/0262160 | A1 | 9/2016 | Mo | |
| 2020/0229071 | A1 | 7/2020 | Ansley et al. | |
| 2022/0021670 | A1 | 1/2022 | Cafasso | |
| 2022/0070172 | A1* | 3/2022 | Muthusamy | H04L 63/0876 |
| 2022/0322089 | A1 | 10/2022 | Cafasso et al. | |
| 2022/0353669 | A1* | 11/2022 | Kreishan | H04W 12/37 |
| 2023/0033287 | A1 | 2/2023 | Agarwal et al. | |
| 2023/0141966 | A1* | 5/2023 | Weeden | H04L 9/3247 713/185 |
| 2023/0401079 | A1 | 12/2023 | Radi et al. | |

OTHER PUBLICATIONS

Author Unknown, "Malcolm—Overview," The Wayback Machine, https://web.archive.org/web/20221127174426/https://malcolm.fyi/docs/, archived on Nov. 27, 2022, 6 pages.

Author Unknown, "Privacy changes in Android 10," The Wayback Machine, https://web.archive.org/web/20230316093218/https://developer.android.com/about/versions/10/privacy/changes, Mar. 15, 2023, 16 pages.

Office Action for Canadian Patent Application No. 3,228,611, dated Feb. 18, 2025, 4 pages.

Extended European Search Report for EP Patent Application No. 23162500.5, dated Sep. 20, 2023, 5 pages.

Office Action for Canadian Patent Application No. 3,228,611, dated Oct. 29, 2025, 3 pages.

Notice of Allowance and Notice of Allowability for U.S. Appl. No. 18/185,741, dated Oct. 16, 2025, 10 pages.

* cited by examiner

PASSING DEVICE CONTEXT INFORMATION AND ASSOCIATED CONNECTED DEVICE IDENTITY TO SERVICE IN CUSTOMER-PREMISES EQUIPMENT

RELATED APPLICATION

This patent application is a continuation-in-part of co-pending U.S. patent application Ser. No. 18/185,741, filed on Mar. 17, 2023, entitled "PASSING CONNECTED DEVICE IDENTITY TO SERVICE IN CUSTOMER-PREMISES EQUIPMENT," the disclosure of which is hereby incorporated herein by reference in its entirety.

BACKGROUND

Delivery of internet-based services (web browsing, voice, Wi-Fi, gaming, streaming TV, on-demand streaming, parental controls, security, etc.) for consumers and businesses is impacted by an obfuscation of a connected device operating in a local area network (LAN, such as Ethernet, Wi-Fi, or another networking technology) implemented by a customer-premises equipment (CPE) such as a router of a network service provider (NSP). The obfuscation causes limitations and inabilities to deliver CPE-based services such as transmission, provisioning, configuration, control, delivery, optimization, diagnosis, troubleshooting, and resolving, which are dependent on standardized device identifiers, such as a Medium/Media Access Control (MAC) address, or an Internet protocol (IP) address. The obfuscation of the connected device is a result of privacy enhancing techniques used by operating systems (OS) of connected devices such as iOS®, Android®, or Windows®. An example of an obfuscation technique is a MAC address randomization, wherein the original vendor-embedded MAC address is changed to a random value and used by the OS to hide the organizationally unique identifier (OUI). The OUI may be a 24-bit number used to identify the device as manufactured by a specific vendor. The implementation and use of the MAC address randomization varies and may cause problems as the services running on the CPE are no more able to rely on the MAC address as a single source of truth in its service delivery.

SUMMARY

According to an aspect of the disclosure, there is provided subject matter of independent claims.

One or more examples of implementations are set forth in more detail in the accompanying drawings and the detailed description.

BRIEF DESCRIPTION OF DRAWINGS

Some examples will now be described with reference to the accompanying drawings, in which.

DETAILED DESCRIPTION

Figure 1:
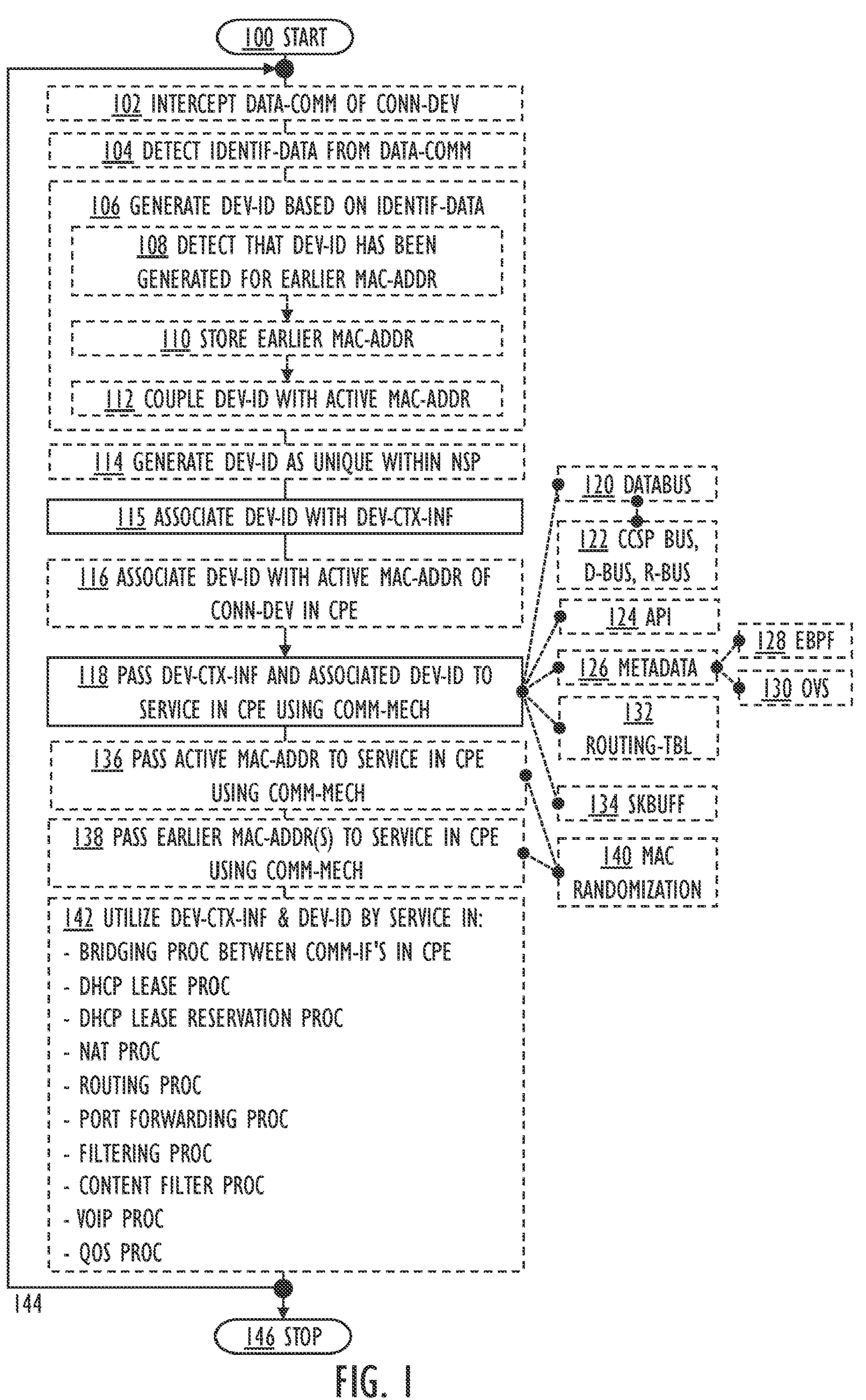
FIG. 1 is a flowchart illustrating examples of a method.

The following description discloses examples. Although the specification may refer to "an" example in several locations, this does not necessarily mean that each such reference is to the same example(s), or that the feature only applies to a single example. Single features of different examples may also be combined to provide other examples. Words "comprising" and "including" should be understood as not limiting the described examples to consist of only those features that have been mentioned as such examples may contain also features and structures that have not been specifically mentioned. The examples and features, if any, disclosed in the following description that do not fall under the scope of the independent claims should be interpreted as examples useful for understanding various examples and implementations of the invention.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together. Device identification, which may be defined as a capability to detect and identify a connected device in a home/office local area network (LAN), increases the cybersecurity. As a result of the device identification, a device identifier of the connected device may be detected. Traditionally, the Medium/Media Access Control (MAC) address is assigned by a device manufacturer and used in the data communication (such as with wireless radio signals) within the LAN for the device identification. However, the MAC randomization, which anonymizes and randomizes the MAC address to increase privacy, hinders the device identification based on the MAC address. A novel device identifier may be generated and associated with an active MAC address of the connected device. The device identifier may be generated so as to be unique within a network service provider's (NSP) platform system used for operating a customer-premises equipment (CPE) configured to implement the LAN for a data communication of the connected device, or unique within a single CPE. The device identifier may be generated locally in the CPE, or in a processing cloud, or in co-operation with the two. The device identifier may be defined global within the NSP in a processing cloud connected to the CPE, may be defined global within the NSP in the CPE using an address space given by the processing cloud to the CPE, or may be defined local in the CPE. The device identifier may also be associated with one or more earlier MAC addresses of the connected device so that the effect of the MAC randomization may be counteracted. The device identifier of the connected device is associated with a device context information of the connected device. The device context information may identify a feature associated with the connected device. The device context information may be obtained from a device identification procedure of the connected device, for example. The device context information and the associated device identifier are passed to a service in the CPE using a communication mechanism.

FIG. 1 illustrates a method. The method performs operations related to the device identifier in an improved manner.

The method starts in 100 and ends in 146. The method may run in principle endlessly. The infinite running may be achieved by looping 144 back after an operation 118 (or after a later optional operation) to the beginning as shown in FIG. 1.

The operations are not strictly in chronological order in FIG. 1, i.e., no special order of operations is required, except where necessary due to the logical requirements for the processing order. In such a case, the synchronization between operations may either be explicitly indicated, or it may be understood implicitly by the skilled person. If no specific synchronization is required, some of the operations may be performed simultaneously or in an order differing from the illustrated order. Other operations may also be executed between the described operations or within the described operations, and other data besides the illustrated data may be exchanged between the operations.

Figure 2:
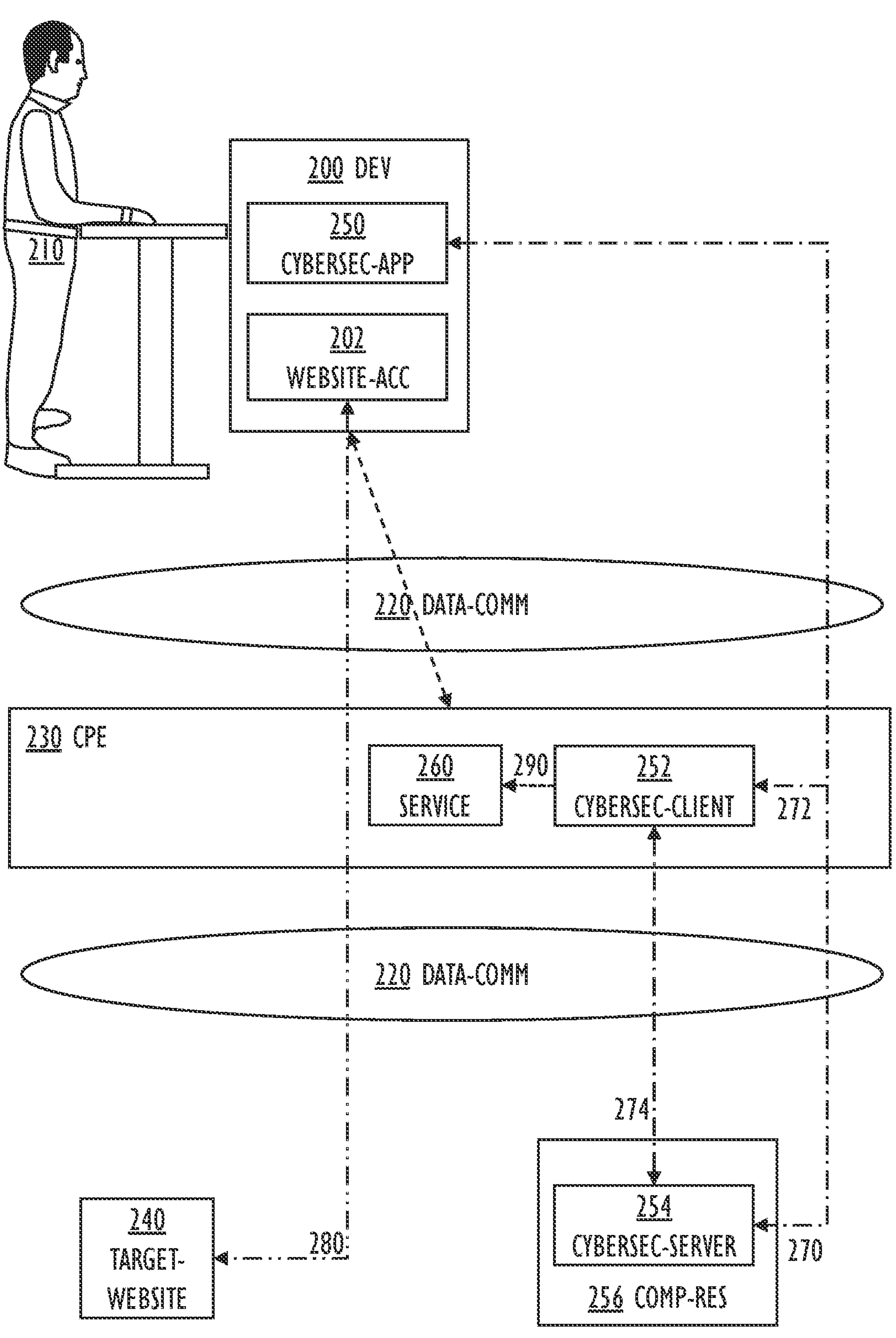
FIG. 2 is a block diagram illustrating an example implementation environment for the method.

FIG. 2 illustrates an example implementation environment for the method. The method may be a computer-implemented method.

First, a device identifier of a connected device 200 connected to a customer-premises equipment (CPE) is associated 115 with a device context information of the connected device 200. The CPE 230 is configured to implement a LAN for a data communication 220 of the connected device 200.

The device context information of the connected device 200 may identify a feature associated with the connected device 200. The feature of the connected device 200 may relate to a specific hardware or software character of the connected device 200. The device context information may comprise one or more of the following: a type of the connected device 200, a model of the connected device 200, a name of the operating system of the connected device 200, a version of the operating system of the connected device 200, a name of the connected device 200. As an example, the connected device 200 may have the following features: type=smartphone, model=Apple iphone 12, operating system name=iOS, operating system version=17.1.2, and connected device name="Timo's iPhone". The device context information may be obtained based on a device identification procedure of the connected device 200.

Optionally, the device identifier may be associated 116 with an active MAC address of a connected device 200 in the CPE 230.

Next, the device context information and the associated device identifier are passed 118 to a service 260 in the CPE 230 using a communication mechanism 290. The CPE 230 is configured to implement a platform for the service 260. The communication mechanism 290 is configured to operate in the CPE 230. The communication mechanism 290 may be coupled with a packet routing mechanism of the CPE 230.

These two operations 115 and 118 implement an architecture, which enables local and/or third party cloud-based services based on a locally known device identifier as the single source of truth in the CPE 230 of the NSP. Additionally, the local and/or third party cloud-based services receive the device context information, which may be used for service processing, for example. Adding the device context information to the device identifier on the CPE 230 reduces an overhead, risk and complexity of a device data synchronization and processing.

CPE-embedded operating system services typically rely on both MAC and IP addresses. The obfuscation of the MAC address does not cause any direct functional limitation on the operating system itself to perform its designed service. The connected device with a randomized MAC address still receives an IP address and the CPE 230 is still able to process the packets belonging to the connected device, which has received the IP address. The real problem caused by the obfuscation is the ability to rely on a constant identity to consistently apply the same service using the same policy to the same connected device 200, which is recognized by the originally used MAC address (which may be a manufacturer-embedded MAC address, or a randomized MAC address).

Let us take an example, a connected device 200, whose original embedded manufacturer MAC address is aa:bb:cc:dd:ee:ff. For a dynamic host configuration protocol (DHCP) lease reservation, the owner or the NSP has defined a policy/rule on the CPE 230 that this MAC address, which belongs to this specific connected device 200, should always get the IP address 192.168.1.72. With this reserved IP address, the owner or the NSP applies specific policies/rules based on the IP address for services like port forwarding, firewall, content filter, etc. Every time the connected device 200 reconnects with the LAN of the CPE 230, the connected device 200 is ensured to receive the same IP address. The DHCP lease reservation record on the CPE 230 LAN is 192.168.1.72=aa:bb:cc:dd:ee:ff. The OS privacy function of the connected device 200 may randomize the MAC address to a new unique address: 00:00:aa:00:00:aa. This causes that the next time the connected device 200 re-connects to the CPE 230 LAN, the connected device 200 will receive an IP address from the DHCP pool, 192.168.1.34, for example. The previously applied policies/rules like DHCP lease reservation, port forwarding, firewall, or content filter cannot any longer be applied to the connected device 200 as it has received a different IP address. All CPE 230 network policies and services relying on the MAC address, or the combination of the MAC address and the IP address for the connected device 200 are impacted by the randomization of the MAC address. The operations provide an architecture, which enables the CPE 230 OS and its local or third party services to be aware of the original/initial MAC address and the active MAC address of the connected device 200 using the local device identifier register on the CPE 230 OS. Furthermore, the CPE 230 OS and its local or third party services are aware of the device context information.

As used herein, the term "connected device" 200 refers to a physical device with communication capabilities configured to communicate via the CPE 230 with the internet. The connected device 200 includes, but is not limited to, a user device, an Internet of Things (IoT) device, or another ubiquitous computing device.

The device identifier is initially generated for the connected device 200. Prior to associating 116 the device identifier with the active MAC address, the device identifier may be generated 114 as a unique device identifier within the NSP's platform system (such as RDK-B or OpenWrt® explained later with reference to FIG. 9) for operating the CPE 230. In this way, each connected device 200 is identifiable by a unique device identifier that is unique among all identifiers for the connected devices within the NSP. The device identifier may be an unsigned long integer (four bytes long), but also other data types with different lengths may be used depending on the use case and the total number of the connected devices 200 gaining service from the numerous CPEs 230 of the NSP.

Prior to associating 116 the device identifier with the active MAC address, the data communication 220 of the connected device 200 may be intercepted 102, identification data may be detected 104 in the data communication 220, and the device identifier may be generated 106 based on the identification data.

As shown in FIG. 2, the connected device 200 is configured to execute a website access application 202, such as web user interface application (a web browser, for example), or a stand-alone application (a mobile app, for example), and as a result, the data communication 220 including network traffic 280 between the connected device 200 and an accessed website 240 is caused. The website access application 202 may automatically cause the data communication 220, or, alternatively, the data communication 220 may be generated as a result of an action by a user 210 through user interface controls of the website access application 202.

The intercepted 102 data communication 220 may be analyzed in order to perform a device identification procedure, by a cybersecurity client 252, possibly augmented by a cybersecurity server 254, or by a device intelligence client supported by a processing cloud (not illustrated in FIG. 2). Machine learning algorithms may use a number of other data items (such as device-specific unique radio interface characteristics, and other active and historic unique identifiers related to the connected apparatus and its communication) to enable the device identification despite of the MAC randomization. Basically, the objective is to detect that the same connected device 200 may use an active MAC address, and one or more earlier MAC addresses. This is described in various applications and patents by the applicant, incorporated herein by reference in all jurisdictions where applicable, such as in US 2022/0021670 A1, US 2022/0322089 A1, and U.S. Pat. No. 11,528,189 B1.

Generating 106 the device identifier based on the identification data may operate so that in response to detecting 108 that the device identifier of the connected device 200 has earlier been generated for an earlier MAC address, storing 110 the earlier MAC address, and coupling 112 the device identifier with the active MAC address.

In the above-described way, the initial device identification may be performed. The analysis of the intercepted data communication 220 may include collecting device traffic metadata and filtering relevant identification data points from network flow sent and received by the connected device 200 in the LAN of the CPE 230. In addition to the analysis of raw data, or as an alternative, refined data (such as metadata) such as datasets, markers, connection requests, etc. may be analyzed. A suitable network flow monitoring technology, such as Cisco® NetFlow or alternative network flow monitoring technologies (which may be implemented as a service of the OS of the CPE 230) may be used to intercept the data communication 220. NetFlow, or its equivalents collect IP network traffic as it enters or exits an interface (in the CPE 230, for example), and based on the collected traffic, a source and a destination of the network traffic (in the form of IP addresses) within the data communication 220 may be determined. The CPE 230 (or more specifically the cybersecurity client 252 running on the CPE 230) sends the data points extracted from the data communication 220 (by the NetFlow, for example) to the cybersecurity server 254. The cybersecurity server 254 feeds the data points to an analysis engine, which analyses the extracted data points and provides a model matching device identifier for the connected device 200 based on the data points. If the analysis engine criteria match to an existing device identifier with another MAC address, a new device identifier is not created (because the same connected device has two or more different MAC addresses due to the MAC randomization). In case the device identifier with earlier (different) MAC address exists, the previous MAC address is stored to a history table in the database and the active MAC address is updated. The device identifier and the associated MAC address are stored in a database (or another data storage) of the cybersecurity server 254, and the device identifier and the associated MAC address pair of data are passed back to a database (or other data storage, or even a cache) of the cybersecurity client 252.

As the CPE 230 implements the LAN for the data communication 220 of the connected device 200, the CPE 230 may intercept 102 the data communication 220.

As used herein, the term "intercepting" 102 refers to user-approved lawful interception or monitoring of the data communication 220, with a purpose and goal of increasing cybersecurity related to the connected device 200 and its operating environment. As the data communication 220 is intercepted 102, the data communication 220 is accessed and collected between the transmitting device and the receiving device. The data communication 220 may be intercepted 102 even if the digital data transmission units (such as messages) in the data communication 220 are addressed to the receiving device. The intercepting 102 may be implemented so that the data communication 220 is passively monitored, i.e., the data communication 220 is not affected by the intercepting 102. Alternatively, if needed, the intercepting 102 may include a seizing of the data communication 220, i.e., the data communication 220 is actively influenced so that a connection and/or requests and/or responses are blocked until it may be decided whether a cybersecurity action is required.

As used herein, the term "data communication" 220 refers to the transmission and/or reception of (digital) data by the connected device 200. The data communication 220 is transferred using digital data transmission units over a communication medium such as one or more communication channels (implemented by copper wires, optical fibers, and wireless communication using radio spectrum, for example) between the connected device 200 and another network node such as the target website 240. The data are a collection of discrete values that convey information, or sequences of symbols that may be interpreted, expressed as a digital bitstream or a digitized analog signal, including, but not being limited to: text, numbers, image, audio, video, and multimedia. The data may be represented as an electromagnetic signal (such as an electrical voltage or a radio wave, for example). The digital transmission units may be transmitted individually, or in a series over a period of time, or in parallel over two or more communication channels, and include, but are not limited to: messages, protocol units, packets, and frames. One or more communication protocols may define a set of rules followed by the connected device 200 and other network nodes to implement the successful and reliable data communication 220. The communication protocols may implement a protocol stack with different conceptual protocol layers. In a connection-oriented data communication 220, a connection needs to be established for transferring the payload data. In a connectionless data communication 220, the payload data is transferred over different paths with an independent routing.

In addition to the device context information and associated the device identifier, the active MAC address of the connected device 200 may be passed 136 to the service 260 in the CPE 230 using the communication mechanism 290. Furthermore, one or more earlier MAC addresses of the connected device 200 may be passed 138 to the service 260 in the CPE 230 using the communication mechanism 290. As explained earlier, the active MAC address and the one or more earlier MAC addresses are different due to the MAC address randomization procedure 140.

The communication mechanism 290 may be implemented with various techniques depending on the design and internal communication capabilities of the CPE 230. The communication mechanism 290 may include various inter-process and inter-component software and hardware mechanisms, including, but not being limited to messages, method calls, Application Programming Interfaces (API), stream sockets, files, tables, etc.

The device identifier and the active MAC address may be pushed 120 as a pair to a databus. The databus is configured to operate in the CPE 230, and be accessible by the service 260. In an example, the databus is a Desktop Bus (D-Bus) 122, which is a message-based mechanism that allows communication between multiple processes running concurrently on the CPE 230. In another example, the databus is a Resource-Bus (R-Bus) 122, which is a 3-layered Remote Procedure Call (RPC) communication bus, and a form of inter-process communication (IPC). The cybersecurity client 252 may push the device identifier and the active MAC address pair to the databus, and any consuming software component of the service 260 may then receive the pair. The eventual one or more earlier MAC addresses may be associated with the pair and pushed to the databus. Furthermore, the device context information may be associated with the pair and pushed to the databus.

The device identifier and the active MAC address may be provided 124 as a pair to an application programming interface (API). The API is configured to operate in the CPE 230, and be accessible by the service 260. The API may operate so that the service 260 inputs the MAC address, and receives the matching device identifier in response, or inputs the device identifier, and receives the matching MAC address in response. Instead, or in addition to, of the active MAC address, the one or more earlier MAC addresses may also act as input or output parameters of the API. Furthermore, the device context information may be associated with the pair, and the device context information may act as an input parameter (or a set of input parameters) of the API, and also as an output parameter (or a set of output parameters) of the API. The API is a type of a software interface, which implements the communication mechanism 290 between the cybersecurity client 252 and the service 260. The API may define an interface to a function in a software library, or specific HTTP request and response messages to a web API.

The device identifier and the active MAC address may be communicated as a pair via a stream socket from the cybersecurity client 252 to the service 260. In general, a socket is one endpoint of a two way communication link between two programs. Each socket has a specific address, which may be composed of an IP address and a port number. In a client/server architecture, the server creates a socket, and waits for the client to contact it. The client creates a socket and then attempts to connect to the server socket. After the connection is established, data containing the device context information, the associated device identifier and the MAC address may be transferred using the connection. The operating system of the CPE 230 may implement the stream socket as an inter-process communications socket or a network socket.

Refined data, such as metadata (obtained from NetFlow, for example) of MAC packets of the data communication 220 may be enriched (by adding or modifying the metadata) 126 with the device context information and the associated device identifier. The metadata is configured to be accessible by the service 260. The metadata represents telemetry of MAC sublayer network connections and the artifacts associated with these connections.

The metadata may comprise an extended Berkeley Packet Filter (eBPF) mechanism 128. For a returning matching connected device 200, the cybersecurity client 252 may enrich the packet metadata with an additional flag on the eBPF mechanism to pass the data to the CPE 230 operating system network stack to consume the packet. The device identifier lookup is done on the eBPF extension, and the device identifier is added as an attribute to the packets matching the active MAC address (or the one or more earlier MAC addresses), and the device context information may be added as one or more attributes. The eBPF makes it possible to run sandboxed programs in the operating system kernel, whereby additional capabilities may be added to the operating system at runtime. The operating system guarantees safety and execution efficiency with a Just-In-Time (JIT) compiler and a verification engine.

The metadata may comprise an Open vSwitch (OVS) mechanism 130. For a returning matching connected device 200, the cybersecurity client 252 enriches the packet metadata with an additional flag on the OVS mechanism to pass the data to the CPE 230 operating system network stack to consume the packet. The device identifier lookup is done on the eBPF extension, and the device identifier is added as an attribute to the packets matching the active MAC address (or the one or more earlier MAC addresses), and the device context information may be added as one or more attributes. The OVS is a an open-source implementation of a distributed multilayer virtual switch, which supports standard management interfaces and protocols.

A device routing table of the CPE may be extended 132 with an additional data attribute containing the device identifier coupled with the active MAC address. For a returning matching connected device 200, the cybersecurity client 252 extends the device routing table (using IPSet tool, for example) by adding the device identifier as an additional data attribute next to the active MAC address (or the one or more earlier MAC addresses) that matches the device identifier and the active MAC address pair. The device context information may also be added as one or more additional data attributes.

The device identifier coupled with the active MAC address may be injected 134 to a socket buffer (skbuff) of the CPE 230. The cybersecurity client 252 may perform this for a returning matching connected device 200. All network-related queues and buffers in the kernel of the Linux operating system of the CPE 230 use a common data structure, struct sk_buff, which is a large struct containing all control information required for the MAC packets of the data communication 220. The common data structure may be modified to contain the device context information.

Figure 3:
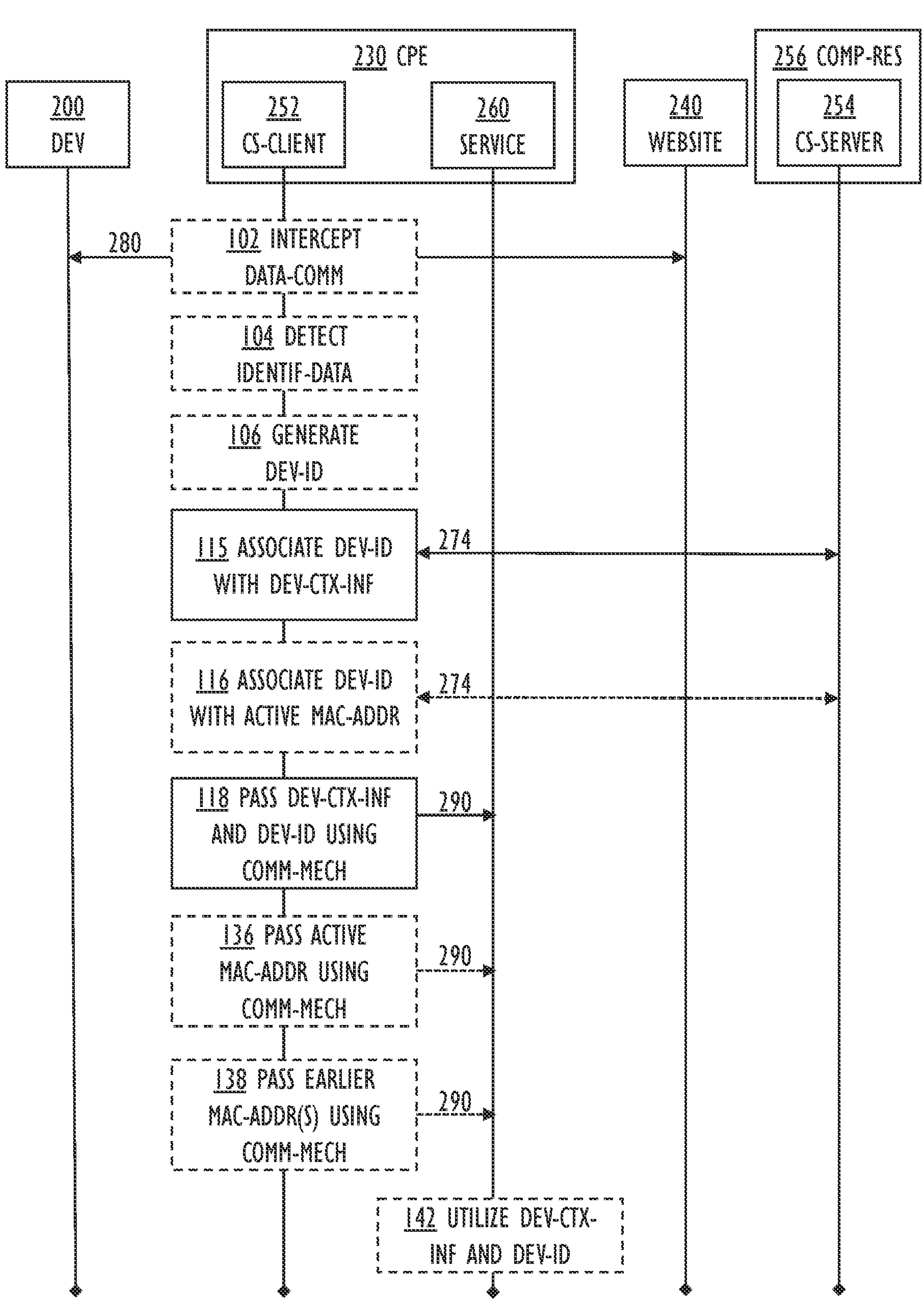
FIG. 3 is a sequence chart illustrating communication between various actors of the method.

FIG. 3 illustrates communication between various actors of the method.

The connected device 200 may create a connection 280 using a packet protocol for the website access application 202 of the connected device 200 to the target website 240. The target website 240 may host a server application enabling access by the website access application 202. The packet protocols include, but are not limited to, Transmission Control Protocol/Internet Protocol (TCP/IP), User Datagram Protocol/Internet Protocol (UDP/IP), and QUIC, which establishes a multiplexed transport on top of the UDP. Various Hypertext Transfer Protocol/Hypertext Transfer Protocol Secure (HTTP/HTTPS) requests may then be transferred in the connection 280 (using TCP streams or UDP datagrams, for example). In the Internet protocol suite, the connection 280 is operated in a link layer, an internet layer, and a transport layer, and the requests transmitted in the connection 280 are operated in an application layer.

As shown in FIG. 3, the earlier described operations 102, 104, 106, 115 and 116 may be performed in a cybersecurity client 252 running in the CPE 230, possibly augmented by processing performed in a cybersecurity server 254 run in a computing resource 256.

The device context information and the associated device identifier are then passed 118 using the communication mechanism 290 from the cybersecurity client 252 to the service 260 running in the CPE 230.

Optionally, as explained earlier, the active MAC address, and possibly also the one or more earlier MAC addresses are passed 136, 138 using the communication mechanism 290 from the cybersecurity client 252 to the service 260.

Finally, the device context information and the associated device identifier are utilized 142 by the service 260 in one or more of following procedures: a bridging procedure between local communication interfaces in the CPE, a dynamic host configuration protocol (DHCP) lease procedure, a DHCP lease reservation procedure, a network address translation (NAT) procedure, a routing procedure, a port forwarding procedure, a filtering procedure, a firewall procedure, a content filter procedure, a voice over Internet protocol (VOIP) procedure, or a quality of service (QoS) procedure.

Figure 4:
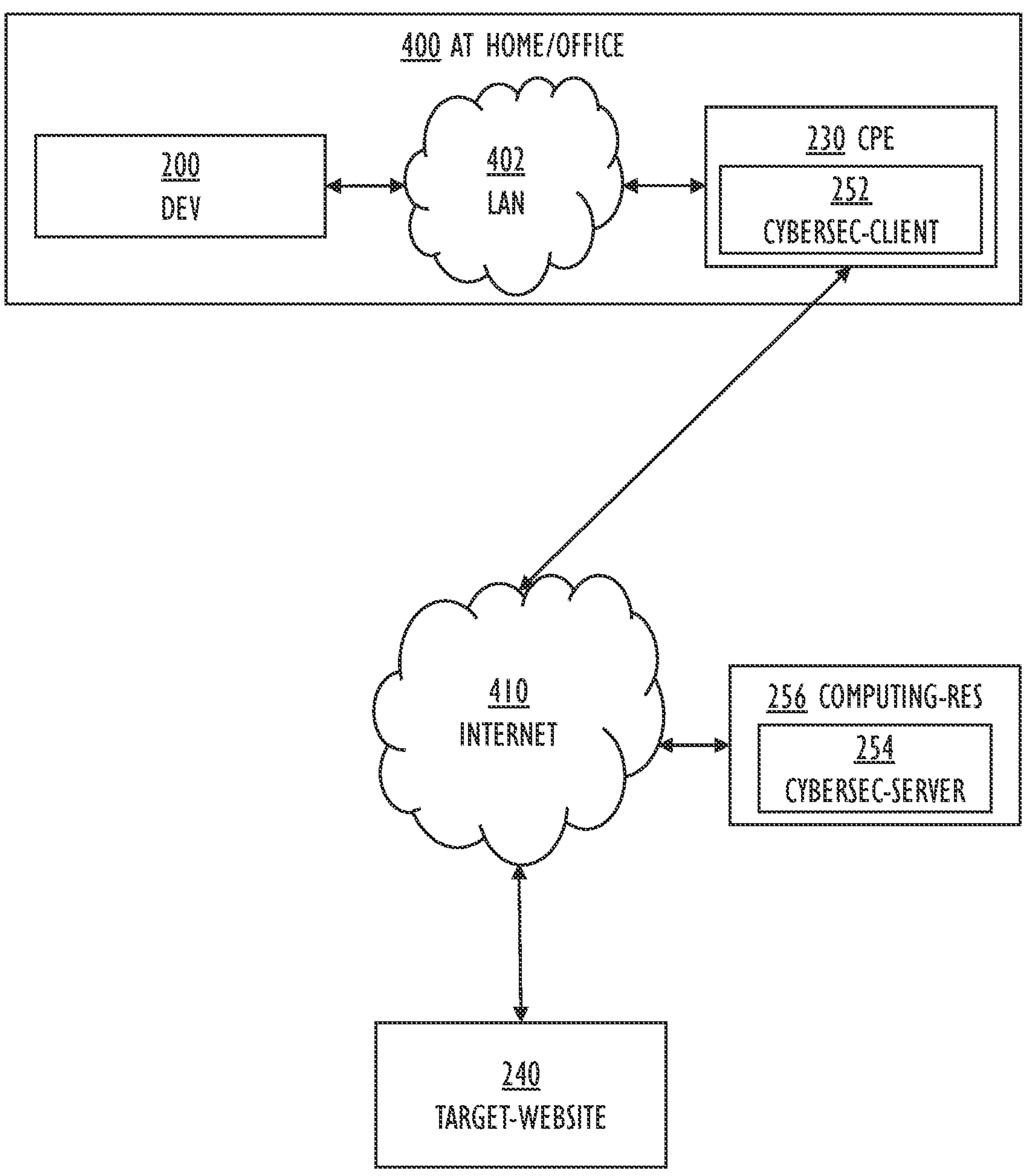
FIG. 4 is a block diagram illustrating an example operation environment.

FIG. 4 illustrates an example operation environment at home or office 400.

The Internet 410 uses the Internet protocol suite including TCP/IP and UDP/IP to globally connect computer networks so that communication is enabled between connected devices 200 and various services provided typically by websites 240. The Internet 410 comprises public networks, private networks, academic networks, business networks, government networks, etc. interlinked with various networking technologies. The various services provide access to vast World Wide Web (WWW) resources, wherein webpages may be written with Hypertext Markup Language (HTML) or Extensible Markup Language (XML) and accessed by a browser or another application (such as a mobile app) running in the connected device 200.

From the cybersecurity point of view, the Internet services may be divided between legitimate services and fraud services. Legitimate services operate according to moral and ethical standards enforced by law, police, or social pressure. Fraud services do not follow moral and ethical standards, and often perform criminal acts to disclose, steal or damage electronic data, software or hardware, or disrupt or misdirect services provided by the electronic data, software, and hardware. Fraud services may be fraudulent to the core, i.e., their only reason for existence is to perform malicious acts, but they may also be legitimate services as such, but being infected with malicious software so as to enable criminal acts. The criminal acts in general include, but are not limited to using a backdoor to bypass security mechanisms, make a denial-of-service attack (DOS), also as a distributed denial-of-service (DDoS), installing software worms or keylogger, eavesdropping a communication, phishing, spoofing, tampering, installing malware, etc. Note that different service providers, such as network service providers, cloud service operators, and cybersecurity operators, just to name a few, may operate and/or manage the various network nodes shown in the FIG. 2.

The CPE 230 is located at home or office 400 of a user 210 of the connected device 200. The CPE 230 is stationary equipment connected to a telecommunication circuit of a carrier (such as an NSP offering internet access using broadband or fixed wireless technologies) at a demarcation point. The demarcation point may be defined as a point at which the public Internet 410 ends and connects with the LAN 402 at the home or office. In this way, the CPE 230 acts as a network bridge, and/or a router.

The CPE 230 may include one or more functionalities of a router, a network switch, a residential gateway (RGW), a fixed mobile convergence product, a home networking adapter, an Internet access gateway, or another access product distributing the communication services locally in a residence or in an enterprise via a (typically wireless) LAN and thus enabling the user 210 of the connected device 200 to access communication services of the NSP, and the Internet 410. Note that the CPE 230 may also be implemented with wireless technology, such as a 4G or 5G CPE 230 configured to exchange a 5G cellular radio network signal with a base station operated by the broadband service provider, and generate a Wi-Fi® (or WLAN) or wired signal to implement the LAN 402 to provide access for the connected device 200. Furthermore, the 4G/5G CPE 230 performs the conversion between the 4G/5G cellular radio network signal and the Wi-Fi® or wired signal.

Figure 5A:
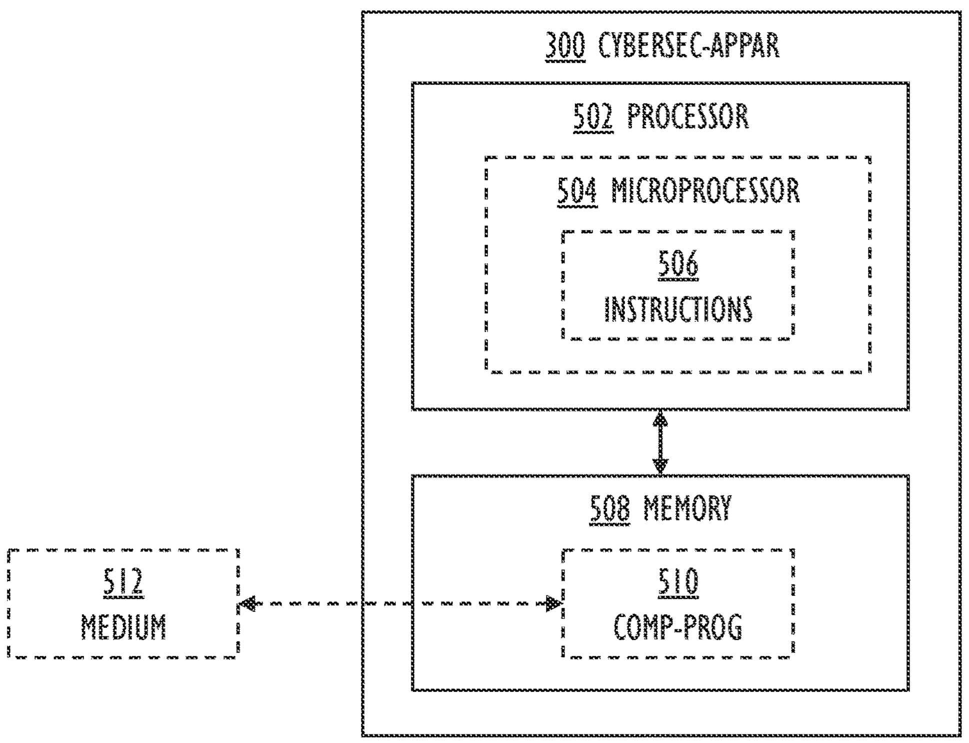
FIG. 5A and FIG. 5B are block diagrams illustrating examples of a cybersecurity apparatus.
Figure 5B:
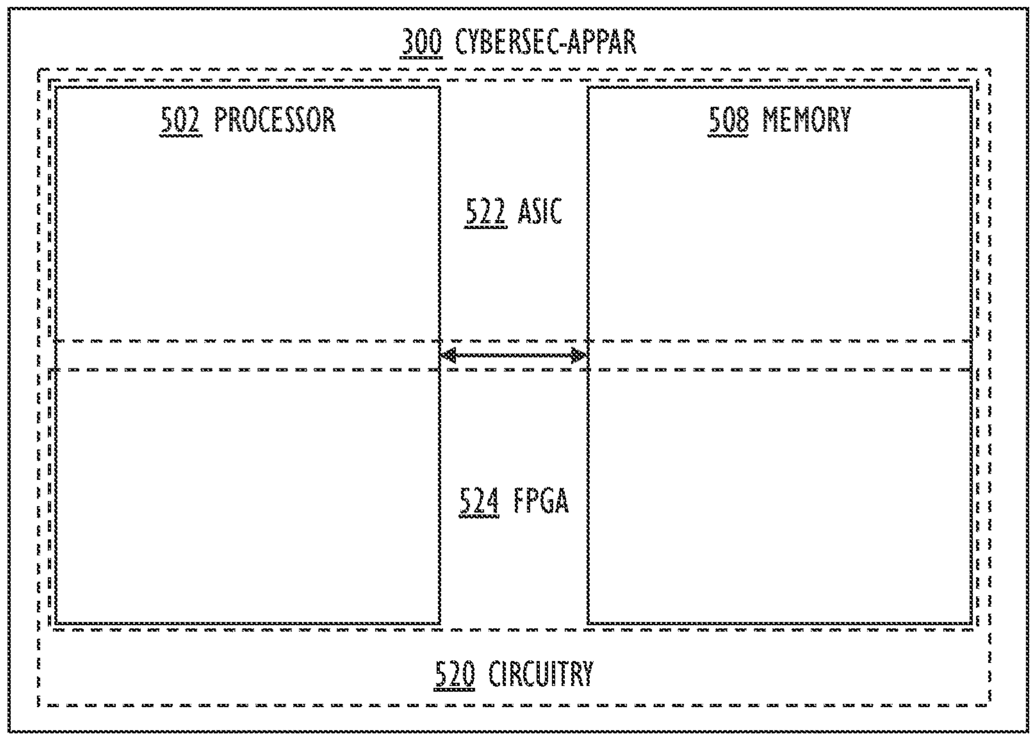

FIG. 5A and FIG. 5B illustrate examples of a cybersecurity apparatus 300. The method described with reference to FIG. 1 may be implemented by the cybersecurity apparatus 300. The apparatus 300 may execute the operations defined in the method. The apparatus 300 may implement an algorithm, which includes at least the operations of the method, but may optionally include other operations related to the cybersecurity in general. Note that the method described with reference to FIG. 1 may be implemented by a more general apparatus as well, such as by the CPE 230, or by a functionality embedded in the CPE 230.

The apparatus 300 comprises one or more memories 508, and one or more processors 502 coupled to the one or more memories 508 configured to execute the operations described in FIG. 1.

The term "processor" 502 refers to a device that is capable of processing data. The term "memory" 508 refers to a device that is capable of storing data run-time (=working memory) or permanently (=non-volatile memory).

As shown in FIG. 5A, the one or more processors 502 may be implemented as one or more microprocessors 504, which are configured to execute instructions 506 of a computer program 510 stored on the one or memories 508. The microprocessor 504 implements functions of a central processing unit (CPU) on an integrated circuit. The CPU is a logic machine executing the instructions 506 of the computer program 510. The CPU may comprise a set of registers, an arithmetic logic unit (ALU), and a control unit (CU). The control unit is controlled by a sequence of the instructions 506 transferred to the CPU from the (working) memory 508. The control unit may contain a number of microinstructions for basic operations. The implementation of the microinstructions may vary, depending on the CPU design. The one or more microprocessors 504 may be implemented as cores of a single processor and/or as separate processors. Note that the term "microprocessor" is considered as a general term including, but not being limited to a digital signal processor (DSP), a digital signal controller, a graphics processing unit, a system on a chip, a microcontroller, a special-purpose computer chip, and other computing architectures employing at least partly microprocessor technology. The memory 508 comprising the working memory and the non-volatile memory may be implemented by a random-access memory (RAM), dynamic RAM (DRAM), static RAM (SRAM), a flash memory, a solid-state drive (SSD), PROM (programmable read-only memory), a suitable semiconductor, or any other means of implementing an electrical computer memory.

The computer program ("software") 510 may be written ("coded") by a suitable programming language, and the resulting executable code may be stored in the memory 508 and executed by the one or more microprocessors 504.

The computer program 510 implements the method/algorithm. The computer program 510 may be coded using a programming language, which may be a high-level programming language, such as Go, Java, C, or C++, or with a low-level programming language, such as an assembler or a machine language. The computer program 510 may be in source code form, object code form, executable file, or in some intermediate form, but for use in the one or more microprocessors 504 it is in an executable form as an application. There are many ways to structure the computer program 510: the operations may be divided into modules, sub-routines, methods, classes, objects, applets, macros, etc., depending on the software design methodology and the programming language used. In modern programming environments, there are software libraries, i.e., compilations of ready-made functions, which may be utilized by the computer program 510 for performing a wide variety of standard operations. In addition, an operating system (such as a general-purpose operating system) may provide the computer program 510 with system services.

As shown in FIG. 5A, a computer-readable medium 512 may store the computer program 510, which, when executed by the apparatus 300 (the computer program 510 may first be loaded into the one or more microprocessors 504 as the instructions 506 and then executed by one or more microprocessors 504), causes the apparatus 300 (or the one or more microprocessors 504) to carry out the method/algorithm. The computer-readable medium 512 may be implemented as a non-transitory computer-readable storage medium, a computer-readable storage medium, a computer memory, a computer-readable data carrier (such as an electrical carrier signal), a data carrier signal (such as a wired or wireless telecommunications signal), or another software distribution medium capable of carrying the computer program 510 to the one or memories 508 of the apparatus 300. In some jurisdictions, depending on the legislation and the patent practice, the computer-readable medium 512 may not be the wired or wireless telecommunications signal.

As shown in FIG. 5B, the one or more processors 502 and the one or more memories 508 may be implemented by a circuitry 520. A non-exhaustive list of implementation techniques for the circuitry 520 includes, but is not limited to application-specific integrated circuits (ASIC) 522, field-programmable gate arrays (FPGA) 524, application-specific standard products (ASSP), standard integrated circuits, logic components, and other electronics structures employing custom-made or standard electronic circuits.

Note that in modern computing environments a hybrid implementation employing both the microprocessor technology of FIG. 5A and the custom or standard circuitry of FIG. 5B is feasible.

Functionality of the apparatus 300, including the capability to carry out the method/algorithm, may be implemented in a centralized fashion by a stand-alone single physical unit, or alternatively in a distributed fashion using more than one communicatively coupled physical units. The physical unit may be a computer, or another type of a general-purpose off-the-shelf computing device, as opposed to a purpose-build proprietary equipment, whereby research and development costs will be lower as only the special-purpose software (and necessarily not the hardware) needs to be designed, implemented, tested, and produced. However, if highly optimized performance is required, the physical unit may be implemented with proprietary or standard circuitry as described earlier.

Figure 6:
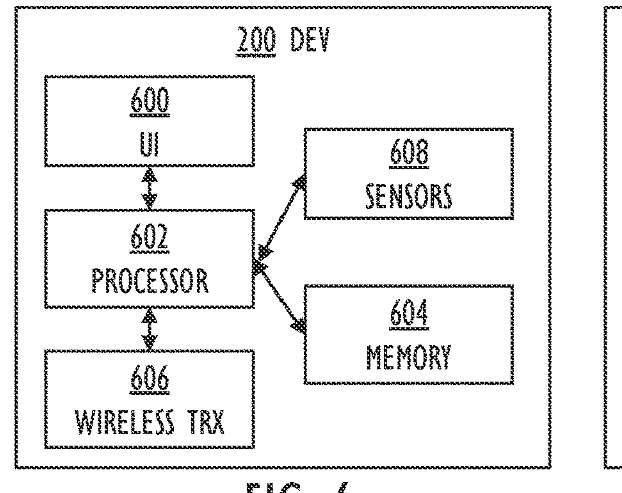
FIG. 6 is a block diagram illustrating an example of a connected device.

FIG. 6 illustrates an example of the connected device 200. The connected device 200 may be a terminal, a user equipment (UE), a radio terminal, a subscriber terminal, a smartphone, a mobile station, a mobile phone, a desktop computer, a portable computer, a laptop computer, a tablet computer, a smartwatch, smartglasses, or some other type of a wired or wireless mobile or stationary communication device operating with or without a subscriber identification module (SIM) or an embedded SIM (eSIM). The user apparatus 200 may be a personal communication device of the user 210. The connected device may also be an Internet of Things (IoT) device 200, which is provided with processing and communication technology and may also include one or more sensors and a user interface, and may be a stand-alone device, or an embedded device in a lighting fixture, thermostat, home security system, camera, smart lock, smart doorbell, smart refrigerator, or another household appliance, heating and cooling system, home and building automation system, vehicle, health and fitness monitor, remote health monitoring system, environmental sensor, IP camera, or network attached storage (NAS), etc.

As shown in FIG. 6, the connected device 200 comprises one or more memories 604, and one or more processors 602 coupled to the one or more memories 604 configured to carry out a part of the method/algorithm. In addition, the connected device 200 comprises a user interface 600 (such as a touch screen or one or more LEDs), and one or more wireless transceivers 606 (such as a WLAN transceiver, a cellular radio network transceiver, and a short-range radio transceiver), and also one or more sensors 608. As shown in FIG. 2 and FIG. 4, the connected device 200 may be running a cybersecurity application 250.

Figure 7:
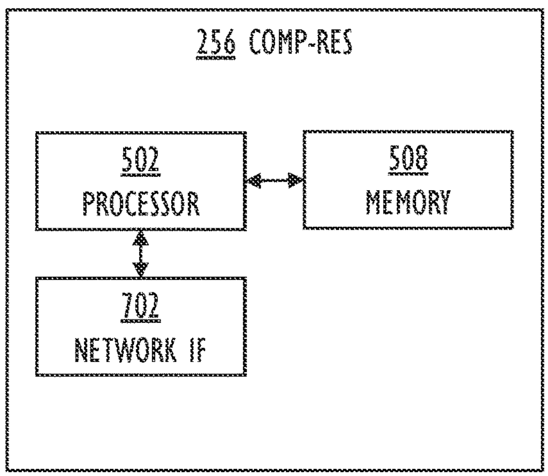
FIG. 7 is a block diagram illustrating an example of a computing resource.

FIG. 7 illustrates an example of a computing resource 256 such as a server apparatus as the apparatus 300. The server apparatus 256 may be a networked computer server, which interoperates with the CPE 230 according to a client-server architecture, a cloud computing architecture, a peer-to-peer system, or another applicable distributed computing architecture. As shown in FIG. 7, the server apparatus 256 comprises the one or more memories 508, and the one or more processors 502 coupled to the one or more memories 508 configured to carry out the method/algorithm. In addition, the server apparatus 256 comprises a network interface (such as an Ethernet network interface card) 702 configured to couple the server apparatus 256 to the Internet 410. As shown in FIG. 4, the computing resource 256 may be running a cybersecurity application 254, such as a cybersecurity server application 254.

Figure 8A:
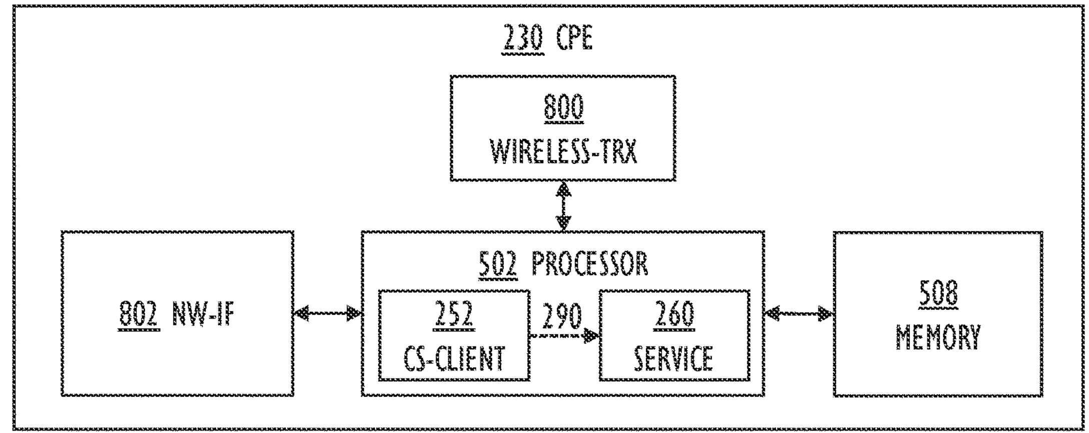
FIG. 8A and FIG. 8B are block diagrams illustrating examples of a customer-premises equipment.
Figure 8B:
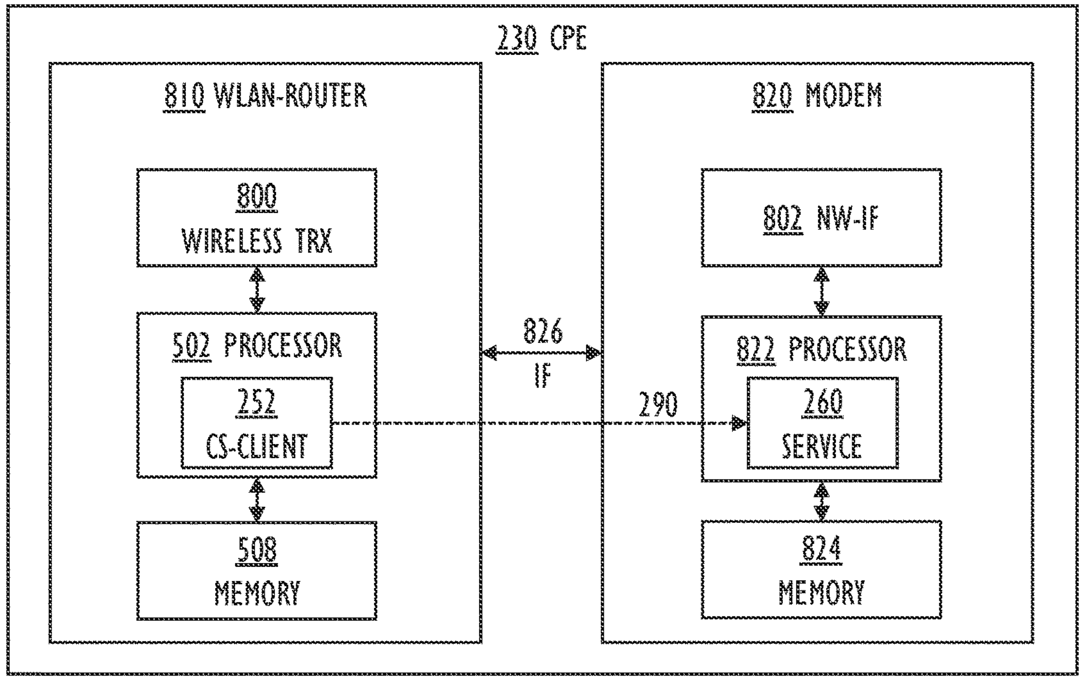

FIG. 8A and FIG. 8B illustrate examples of a customer-premises equipment 230 as the apparatus 300.

In FIG. 8A, the CPE 230 is an integrated apparatus comprising the one or more memories 508, and the one or more processors 502 coupled to the one or more memories 508 configured to carry out the method/algorithm. Additionally, the CPE 230 comprises a wireless radio transceiver 800 configured to create the WLAN 402 for enabling access by the connected device 200. The CPE 230 also comprises a network interface 802 to act as a modem configured to connect to the telecommunication circuit of the carrier at the demarcation point. The network interface 802 may operate as a Digital Subscriber Line (DSL) modem using different variants such as Very high bitrate DSL (VDSL), Symmetric DSL (SDSL), or Asymmetric DSL (ADSL). The network interface 820 may also operate using alternative wired or even wireless access technologies including, but not being limited to: the Data Over Cable Service Interface Specification (DOCSIS), the Gigabit-capable Passive Optical Network (GPON), the Multimedia over Coax Alliance (MoCA®), the Multimedia Terminal Adapter (MTA), and the fourth generation (4G) or fifth generation (5G) cellular radio network access technology. As shown in FIG. 4, the CPE 230 may be running a cybersecurity client 252. The CPE 230 is configured to implement a platform for the service 260. The communication mechanism 290 is configured to operate in the CPE 230. As shown in FIG. 8A, the platform may be provided by the one or more memories 508, and the one or more processors 502, and the communication mechanism 290 may be any suitable mechanism including a packet-routing mechanism, inter-process communication techniques, message-based communication interfaces, internal databus techniques, etc.

In FIG. 8B, the CPE 230 is a two-part apparatus. A WLAN router part 810 comprises the one or more memories 508, the one or more processors 502 coupled to the one or more memories 508 configured to carry out the method/algorithm, and the wireless transceiver 800 to create the WLAN 402 for enabling access by the connected device 200. A modem part 820 comprises one or more processors 822 coupled to one or more memories 824 configured to carry out modem operations, and the network interface 802 to act as the modem configured to connect to the telecommunication circuit of the carrier at the demarcation point. The WLAN router part 810 may be purchased by the user 210 of the connected device 200 to gain access to the method/algorithm, whereas the modem part 820 may be provided by a carrier providing the telecommunication circuit access. As shown in FIG. 8B, the WLAN router part 810 and the modem part 820 may be communicatively coupled by an interface 826 (such as a wired Ethernet interface). As shown in FIG. 8B, the platform may be provided by the one or more memories 508, and the one or more processors 502, but also additionally, or alternatively, by the one or more memories 824, and the one or more processors 822. The communication mechanism 290 may be any suitable mechanism including a packet-routing mechanism, inter-process communication techniques, message-based communication interfaces, internal databus techniques, inter-processor communication techniques, inter-processor databus techniques, etc.

Instead of the cybersecurity client 252 illustrated in FIG. 8A and FIG. 8B, another component running on the CPE 230 may be configured to run an algorithm implementing the method of FIG. 1

Figure 9:
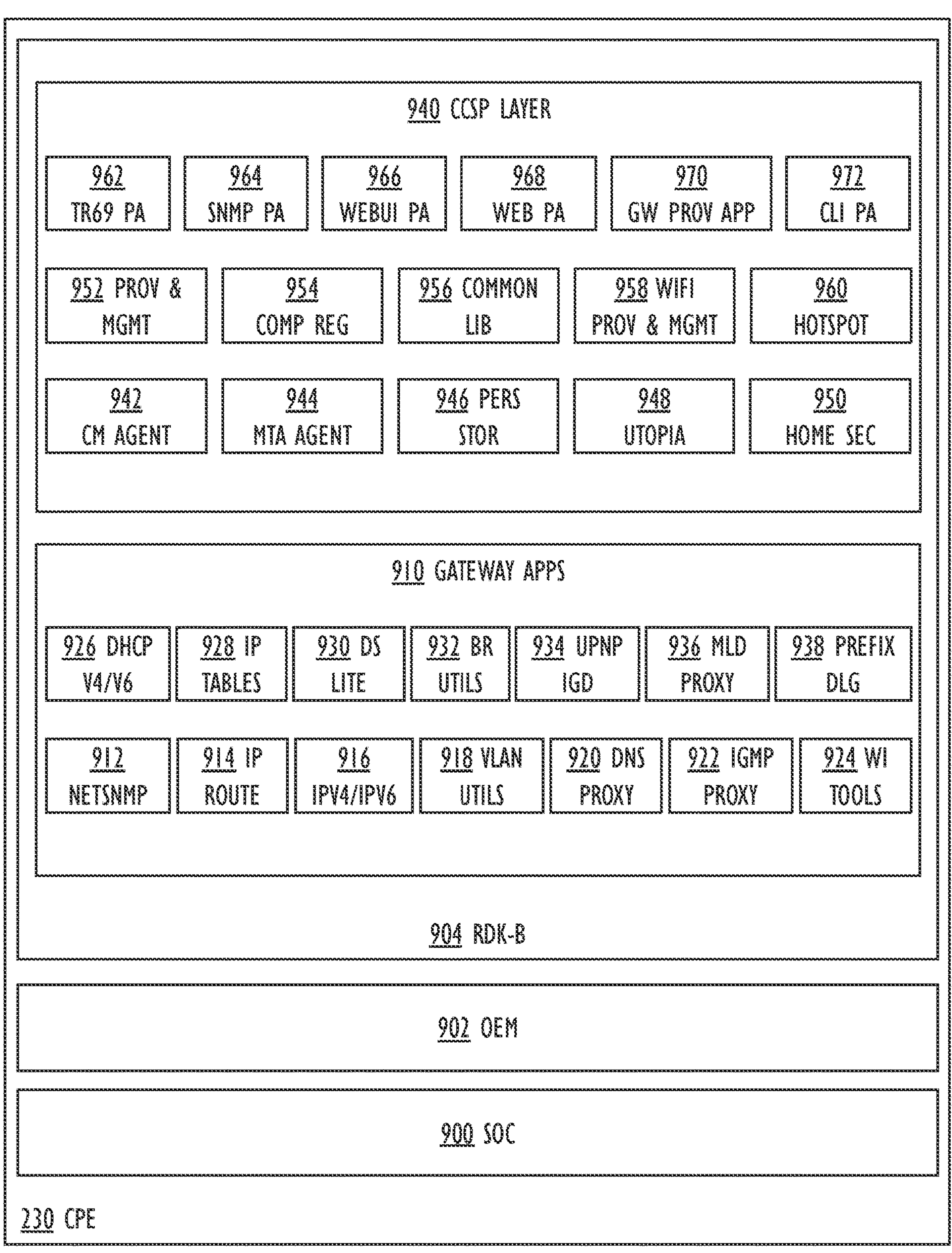
FIG. 9 is a block diagram illustrating an example software stack of the customer-premises equipment.

FIG. 9 illustrates an example of a modular software stack of the CPE 230. In the example, the Reference Design Kit for Broadband (RDK-B) 904 is used, but the implementation is not limited to that as it may be implemented in other applicable environments as well. At the time of writing of this patent application, more information regarding the RDK may be found in wiki.rdkcentral.com.

Another alternative implementation environment is Open Wireless Router (OpenWrt®), which is an open-source project for embedded operating systems of the CPE 230 based also on Linux. At the time of writing of this patent application, more information regarding the OpenWrt® may be found in openwrt.org.

In general, the CPE 230 may be configured to implement the platform for the service in the middleware (such as the RDK-B or the OpenWrt®) of the CPE 230, and, in addition, the communication mechanism 290 may be configured to operate in the middleware of the CPE 230.

The RDK-B is built using a collection of individually reusable software components. The RDK-B 904 is based on the following design considerations: software modularity, abstraction of external management protocols, independence from Wide Area Network (WAN) type, silicon independence, Linux kernel independence, and software structure allowing multiple organizations and teams to work in parallel.

In addition to the RDK-B 904, the basic software on the CPE 230 includes, but is not limited to: a System on a Chip (SoC) software 900, and an Original Equipment Manufacturer (OEM) software 902.

The SoC software 900 provides interfaces to various environments, and may comprise a kernel (of the operating system), a DOCSIS software, an MTA software, Open Source Patches software, a BusyBox software, and various other components, for example.

The Busy Box provides several Unix utilities in a Portable Operating System Interface (POSIX®) environment specified by the IEEE® Computer Society. The POSIX environments include, but are not limited to: Linux, Android®, FreeBSD, and other embedded operating systems of the CPE 230.

The OEM software 902 may comprise various sources and patches such as for DOCSIS and MTA, various drivers such as for Wi-Fi® and MoCA®, various Management Information Bases (MIBS) such as for DOCSIS, MTA, and MoCA®, various Hardware Abstraction Layers (HAL) such as for Wi-Fi®, MTA, and Cable Modem (CM), and various other components, for example.

The RDK-B 904 comprises gateway apps 910, and a Common Component Software Platform (CCSP) layer 940 originally developed by Cisco®.

The RDK-B 904 is a middleware ("software glue"), which provides functionality that is not available from the operating system of the CPE 230. The RDK-B 904 components combined with SoC 900 and OEM 902 components allow the creation of a fully functional software stack that supports gateway applications. The RDK-B 904 comprises a set of software components, tools and documentation. In a porting process (to a new hardware) the generic RDK-B source is customized with SoC and OEM specific packages.

The components of the RDK-B 904 are designed to avoid platform or silicon dependencies. The HAL defines a standard interface for hardware vendors to implement. The HAL layer abstracts the underlying hardware such as Wi-Fi®, MOCAR®, etc. through a standard set of APIs defined as part of RDK-B HAL for the respective components. This HAL layer is implemented per platform and the rest of the components may be compiled to run on a new platform without major modifications. The MIBS of each underlying hardware translate numerical strings into human readable text. When a Simple Network Management Protocol (SNMP) device sends a message it identifies each data object in the message with a number string called an object identifier (OID). The MIB provides a text label called for each OID. An SNMP manager uses the MIB as a codebook for translating the OID numbers into a human-readable display.

The gateway apps 910 comprise a NetSNMP app 912, an IP route app 914, an IPV4/IPV6 app 916, a Virtual Local Area Network (VLAN) utils app 918, a Domain Name System (DNS) proxy app 920, an Internet Group Management (IGMP) proxy app 922, wireless tools app 924, a Dynamic Host Configuration Protocol (DHCP) V4/V6 app 926, an IP Tables app 928, a Device Settings (DS) Lite app 930, a bridge utils app 932, a Universal Plug and Play (UPnP) Internet Gateway Device (IGD) app 934, a Multicast Listener Discovery (MLD) proxy app 936, and a prefix delegation app 938, for example.

The CCSP layer 940 comprises components as one or more run-time processes, for example. Each CCSP component comprises a reusable set of software configured to provide a defined set of service(s). The CCSP component may send and/or receive and handle requests via a CCSP Message Bus. All CCSP components may extend from a Base CCSP Component, which defines common core methods.

The CCSP layer 940 comprises a CM agent component 942, an MTA agent component 944, a persistent storage component 946, a Utopia component 948, a home security component 950, a provisioning and management component 952, a component registry component 954, a common library component 956, a Wi-Fi® provisioning and management component 958, a hotspot component 960, a Technical Report 069 (TR-069) protocol agent (PA) component 962, an SNMP PA component 964, a web user interface (UI) PA component 966, a web PA component 968, a gateway (GW) provisioning application component 970, and a Command Line Interface (CLI) PA component 972, for example.

The various protocol agents 962, 964, 966, 968, 972, and the provisioning application 970 provide a management interface for the CPE 230 on the CCSP layer 940. External managers and servers, such as an Auto Configuration Server (ACS), an SNMP manager, a webPA server, or even applications, such as a web browser, or a Secure Shell Protocol (SSH) application, may manage via said management interfaces the CPE 230. For example, the webPA server on the network is configured to communicate using webPA, which is a secure web protocol messaging system for bi-directional communication between a cloud server and an RDK device such as the CPE 230. The webPA was built specifically with security and performance as priorities. The WebPA 2.0 commonly known as Xmidt is a combination of a server cluster and client, which provides a data path to the CPEs 230 deployed all over the world.

The services 260 on the CPE 230 may be implemented as the CCSP components on the CCSP layer 940. Consequently, the communication mechanism 290 may be implemented as the CCSP message bus 122 (using the D-Bus or the R-Bus for the IPC, for example). The associating 115 of the device identifier with the device context information (and optionally the associating 116 of the device identifier with the active MAC address), and the passing 118 of the device context information and the associated device identifier to the service may be implemented in the home security component 950 of the CCSP layer, or these operations may be performed by an additional component on the CCSP layer 940, such as by the cybersecurity client 252 implemented as a CCSP component on the CCSP layer 940.

Note that the cybersecurity apparatus 300 of FIG. 5A and FIG. 5B may use the association of the device identifier with the active MAC address of the connected device 200 internally. If needed, the communication mechanism 290 may thus be extended so that the device context information and the associated device identifier (and possibly also the active MAC address and/or the one or more earlier MAC addresses) may be passed 270, 272, 274 between two or more of the cybersecurity client 252, the cybersecurity server 254, and the cybersecurity application 250.

As illustrated in FIG. 2, the functionality of the apparatus 300, including the capability to carry out the method/algorithm, may be implemented in a centralized fashion by a stand-alone single physical unit, or alternatively in a distributed fashion using more than one communicatively coupled physical units.

These physical units comprise the CPE 230 running the cybersecurity client 252, and the computing resource 256 running the cybersecurity server 254. The method/algorithm operations may be implemented by one or more of these apparatuses 230/256 executing the cybersecurity software 252/254.

As can be understood by the person skilled in the art, the method/algorithm operations may be distributed among the distributed software comprising the cybersecurity client 252, and the cybersecurity server 254 in different configurations. In an example, the cybersecurity client 252 communicates 274 with the cybersecurity server 254 to implement the method/algorithm functionality.

Thus, the cybersecurity client 252 may comprise a stand-alone fashion to carry out the method/algorithm, or a part of the functionality augmented by the functionality of the cybersecurity server 254. The cybersecurity client 252 may operate as a frontend with a relatively limited resources as regards to the processor and memory, whereas the cybersecurity server 254 may operate as a backend with a relatively unlimited resources as regards to the processor and memory, and the capability to serve a very large number of the connected devices 200 simultaneously.

Even though the invention has been described with reference to one or more examples according to the accompanying drawings, it is clear that the invention is not restricted thereto but can be modified in several ways within the scope of the appended claims. All words and expressions should be interpreted broadly, and they are intended to illustrate, not to restrict, the examples. As technology advances, the inventive concept defined by the claims can be implemented in various ways.

What is claimed is:

1. A computer-implemented method comprising:

associating a device identifier of a connected device connected to a customer-premises equipment (CPE) with a device context information of the connected device, wherein the CPE is configured to implement a local area network (LAN) for a data communication of the connected device and wherein the device identifier is generated outside of the connected device; and passing the device context information and the associated device identifier to a service in the CPE using a communication mechanism, wherein the CPE is configured to implement a platform for the service, and wherein the communication mechanism is configured to operate in the CPE.

2. The method of claim 1, further comprising:

associating the device identifier with an active medium access control (MAC) address of the connected device.

3. The method of claim 2, further comprising:

prior to associating the device identifier with the active MAC address, generating the device identifier as a unique device identifier within a network service provider operating the CPE.

4. The method of claim 2, further comprising:

prior to associating the device identifier with the active MAC address, intercepting the data communication of the connected device;

detecting identification data in the data communication; and generating the device identifier based on the identification data.

5. The method of claim 4, wherein generating the device identifier based on the identification data further comprises:

in response to detecting that the device identifier of the connected device has earlier been generated for an earlier MAC address, storing the earlier MAC address, and coupling the device identifier with the active MAC address.

6. The method of claim 2, further comprising:

passing the active MAC address of the connected device to the service in the CPE using the communication mechanism.

7. The method of claim 6, further comprising:

passing one or more earlier MAC addresses of the connected device to the service in the CPE using the communication mechanism.

8. The method of claim 7, wherein the active MAC address and the one or more earlier MAC addresses are different due to a MAC address randomization procedure.

9. The method of claim 2, wherein passing the device context information and the associated device identifier to the service in the CPE using the communication mechanism further comprises:

pushing the device identifier and the active MAC address as a pair to a databus, wherein the databus is configured to operate in the CPE, and be accessible by the service.

10. The method of claim 9, wherein the databus is implemented as one or more of a Common Component Software Platform (CCSP) bus, a Desktop Bus (D-Bus), and a Resource Bus (R-Bus).

11. The method of claim 2, wherein passing the device context information and the associated device identifier to the service in the CPE using the communication mechanism further comprises:

providing the device identifier and the active MAC address as a pair to an application programming interface, wherein the application programming interface is configured to operate in the CPE, and be accessible by the service.

12. The method of claim 2, wherein passing the device context information and the associated device identifier to the service in the CPE using the communication mechanism further comprises:

enriching metadata of MAC packets of the data communication with the device context information and the associated device identifier, wherein the metadata is configured to be accessible by the service.

13. The method of claim 12, wherein the metadata comprises one of an extended Berkeley Packet Filter (eBPF) mechanism, or an Open vSwitch (OVS) mechanism.

14. The method of claim 2, wherein passing the device context information and the associated device identifier to the service in the CPE using the communication mechanism further comprises:

extending a device routing table of the CPE with an additional data attribute containing the device identifier coupled with the active MAC address, and one or more additional data attributes containing the device context information.

15. The method of claim 2, wherein passing the device context information and the associated device identifier to the service in the CPE using the communication mechanism further comprises:

injecting the device context information and the associated device identifier coupled with the active MAC address to a socket buffer (skbuff) of the CPE.

16. The method of claim 1, further comprising:

utilizing, by the service, the device context information and the associated device identifier in one or more of following procedures: a bridging procedure between local communication interfaces in the CPE, a dynamic host configuration protocol (DHCP) lease procedure, a DHCP lease reservation procedure, a network address translation (NAT) procedure, a routing procedure, a port forwarding procedure, a filtering procedure, a firewall procedure, a content filter procedure, a voice over Internet protocol (VOIP) procedure, or a quality of service (QOS) procedure.

17. The method of claim 1, wherein the device context information of the connected device identifies a feature associated with the connected device and comprises one or more of the following: a type of the connected device, a model of the connected device, a name of the operating system of the connected device, a version of the operating system of the connected device, a name of the connected device.

18. The method of claim 1, further comprising:

obtaining the device context information based on a device identification procedure of the connected device.

19. An apparatus comprising:

one or more memories; and one or more processors coupled to the one or more memories configured to:

associate a device identifier of a connected device connected to a customer-premises equipment (CPE) with a device context information of the connected device, wherein the CPE is configured to implement a local area network (LAN) for a data communication of the connected device and wherein the device identifier is generated outside of the connected device; and pass the device context information and the associated device identifier to a service in the CPE using a communication mechanism, wherein the CPE is configured to implement a platform for the service, and wherein the communication mechanism is configured to operate in the CPE.

20. A non-transitory computer-readable medium comprising a computer program with instructions which, when executed by an apparatus, cause the apparatus to:

associate a device identifier of a connected device connected to a customer-premises equipment (CPE) with a device context information of the connected device, wherein the CPE is configured to implement a local area network (LAN) for a data communication of the connected device and wherein the device identifier is generated outside of the connected device; and pass the device context information and the associated device identifier to a service in the CPE using a communication mechanism, wherein the CPE is configured to implement a platform for the service, and wherein the communication mechanism is configured to operate in the CPE.

* * * * *